(12) United States Patent
Otokuni (10) Patent No.: US 6,365,910 B1
(45) Date of Patent: Apr. 2, 2002

(54) APPARATUS FOR SCANNING SHEET-LIKE RECORDING MEDIUM

(75) Inventor: Shinji Otokuni, Minamiashigara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/416,945

(22) Filed: Oct. 13, 1999

(30) Foreign Application Priority Data

Oct. 16, 1998 (JP) .......................................... 10-295859

(51) Int. Cl.$^7$ .............................................. G03B 42/02
(52) U.S. Cl. ...................................................... 250/589
(58) Field of Search ................................. 250/584, 585, 250/586, 587, 588, 589, 590

(56) References Cited

U.S. PATENT DOCUMENTS

| | | | | |
|---|---|---|---|---|
| 4,780,767 A | * | 10/1988 | Ohta et al. ................. | 358/296 |
| 4,975,580 A | * | 12/1990 | Ohgoda et al. ............. | 250/589 |
| 5,340,995 A | * | 8/1994 | Verbeke et al. ............ | 250/581 |
| 5,530,259 A | * | 6/1996 | Arakawa .................... | 250/584 |

FOREIGN PATENT DOCUMENTS

JP 10178514 A * 6/1998 ............ H04N/1/04

* cited by examiner

Primary Examiner—Constantine Hannaher
(74) Attorney, Agent, or Firm—Sughrue Mion, PLLC (57) ABSTRACT

A reading unit has an auxiliary scanning feed mechanism for feeding a stimulable phosphor sheet vertically in an auxiliary scanning direction, a laser beam applying mechanism for applying a laser beam substantially horizontally to the stimulable phosphor sheet and scanning the stimulable phosphor sheet with the laser beam in a main scanning direction, a reading mechanism for photoelectrically reading radiation image information carried by the stimulable phosphor sheet, and a sheet holding mechanism for holding opposite surfaces of the stimulable phosphor sheet to prevent the stimulable phosphor sheet from being unduly displaced transversely back and forth in the beam applying position. A scanning apparatus which incorporates the reading unit is relatively simple in structure, small in size, and allows high-quality radiation image information to be read from the stimulable phosphor sheet.

13 Claims, 7 Drawing Sheets

APPARATUS FOR SCANNING SHEET-LIKE RECORDING MEDIUM

BACKGROUND OF THE INVENTION

1. Field of the Invention

The present invention relates to an apparatus for scanning a sheet-like recording medium such as a stimulable phosphor sheet to read radiation image information of a subject that is carried by the sheet-like recording medium.

2. Description of the Related Art

There is known a system for recording radiation image information of a subject such as a human body with a stimulable phosphor, and reproducing the recorded radiation image information on a photosensitive medium such as a photographic film, or displaying the recorded radiation image information on a display device such as a CRT or the like.

The stimulable phosphor is a phosphor which, when exposed to an applied radiation (X-rays, α-rays, γ-rays, electron beams, ultraviolet radiation, or the like), stores a part of the energy of the radiation, and, when subsequently exposed to applied stimulating rays such as visible light, emits light in proportion to the stored energy of the radiation. Usually, a sheet provided with a layer of the stimulable phosphor, or a stimulable phosphor sheet, is used for easy handling.

The above known system includes a built-in radiation image information reading apparatus which comprises an exposure unit for recording radiation image information of a subject on a stimulable phosphor sheet, an image information reading unit for applying stimulating rays to the stimulable phosphor sheet with the recorded radiation image information to photoelectrically reading the recorded radiation image information, and an erasing unit for erasing remaining image information from the stimulable phosphor sheet after the recorded image information has been read. The stimulable phosphor sheet is circulated or moved back and forth in the built-in radiation image information reading apparatus.

Figure 7:
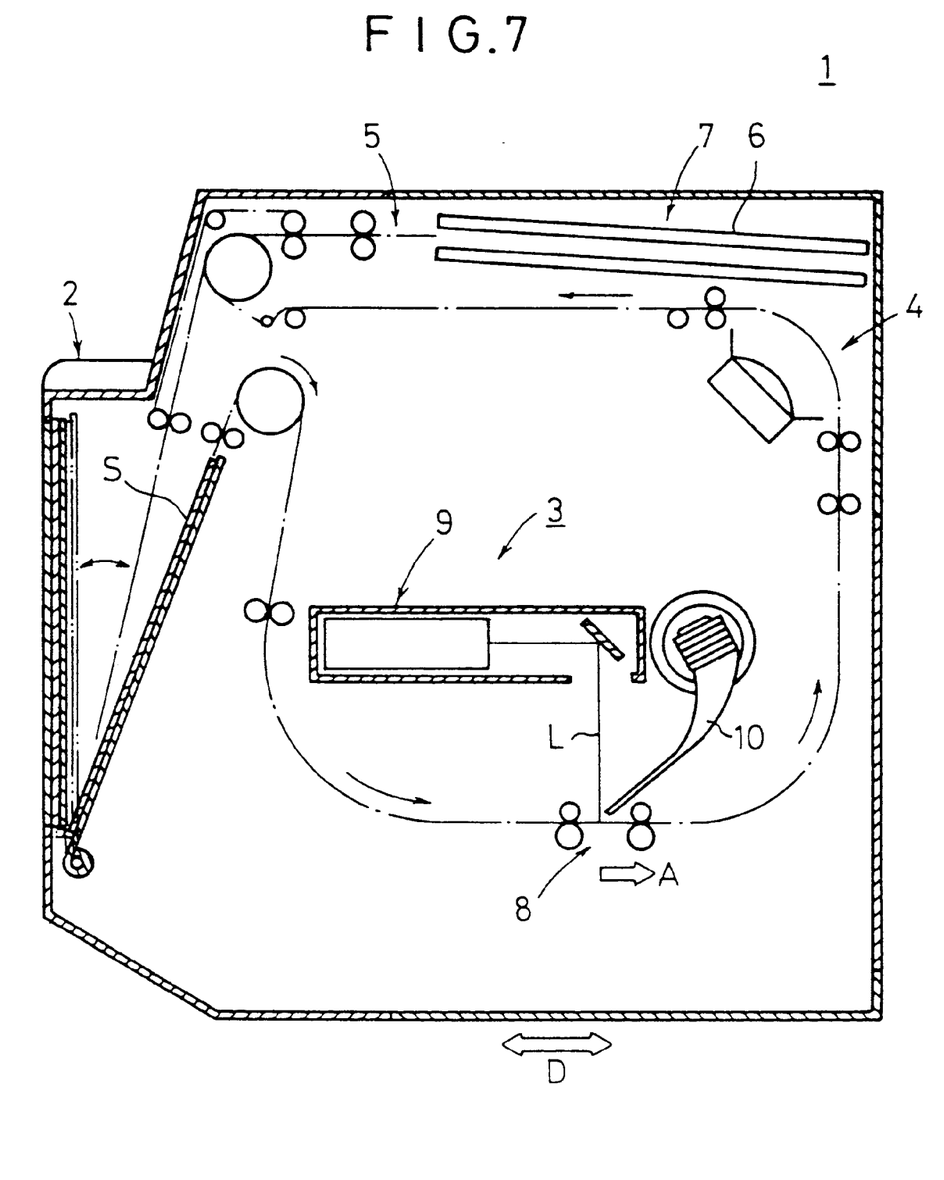
FIG. 7 is a vertical cross-sectional view of an internal structure of a conventional radiation image information reading apparatus.

FIG. 7 of the accompanying drawings shows an internal structure of a general radiation image information reading apparatus 1. As shown in FIG. 7, the radiation image information reading apparatus 1 has an exposure unit 2 for temporarily recording radiation image information of a subject on a stimulable phosphor sheet S, an image information reading unit 3 for applying a laser beam L as stimulating rays to the stimulable phosphor sheet S to photoelectrically reading the recorded radiation image information, an erasing and feeding unit 4 for erasing remaining image information from the stimulable phosphor sheet S after the recorded image information has been read, a circulatory feed system 5 for circulating the stimulable phosphor sheet S, and a stacker 7 for placing therein a magazine 6 which houses the stimulable phosphor sheet S.

The image information reading unit 3 has an auxiliary scanning feed system 8 for feeding the stimulable phosphor sheet S in an auxiliary scanning direction indicated by the arrow A, an optical system 9 for applying the stimulable phosphor sheet S being fed in the auxiliary scanning direction in a main scanning direction substantially perpendicular to the auxiliary scanning direction, and a light guide system 10 for photoelectrically reading light emitted from the stimulable phosphor sheet S when the laser beam L is applied thereto.

In the image information reading unit 3, the stimulable phosphor sheet S is fed horizontally in the auxiliary scanning direction indicated by the arrow A. Therefore, the image information reading unit 3 is considerably elongate in the horizontal direction. Accordingly, the radiation image information reading apparatus 1 has a considerably large depth in the direction indicated by the arrow D.

SUMMARY OF THE INVENTION

It is therefore an object of the present invention to provide an apparatus for scanning a sheet-like recording medium, which has a relatively small construction and a reduced size, and is capable of easily reading recorded image information of high quality from the sheet-like recording medium.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
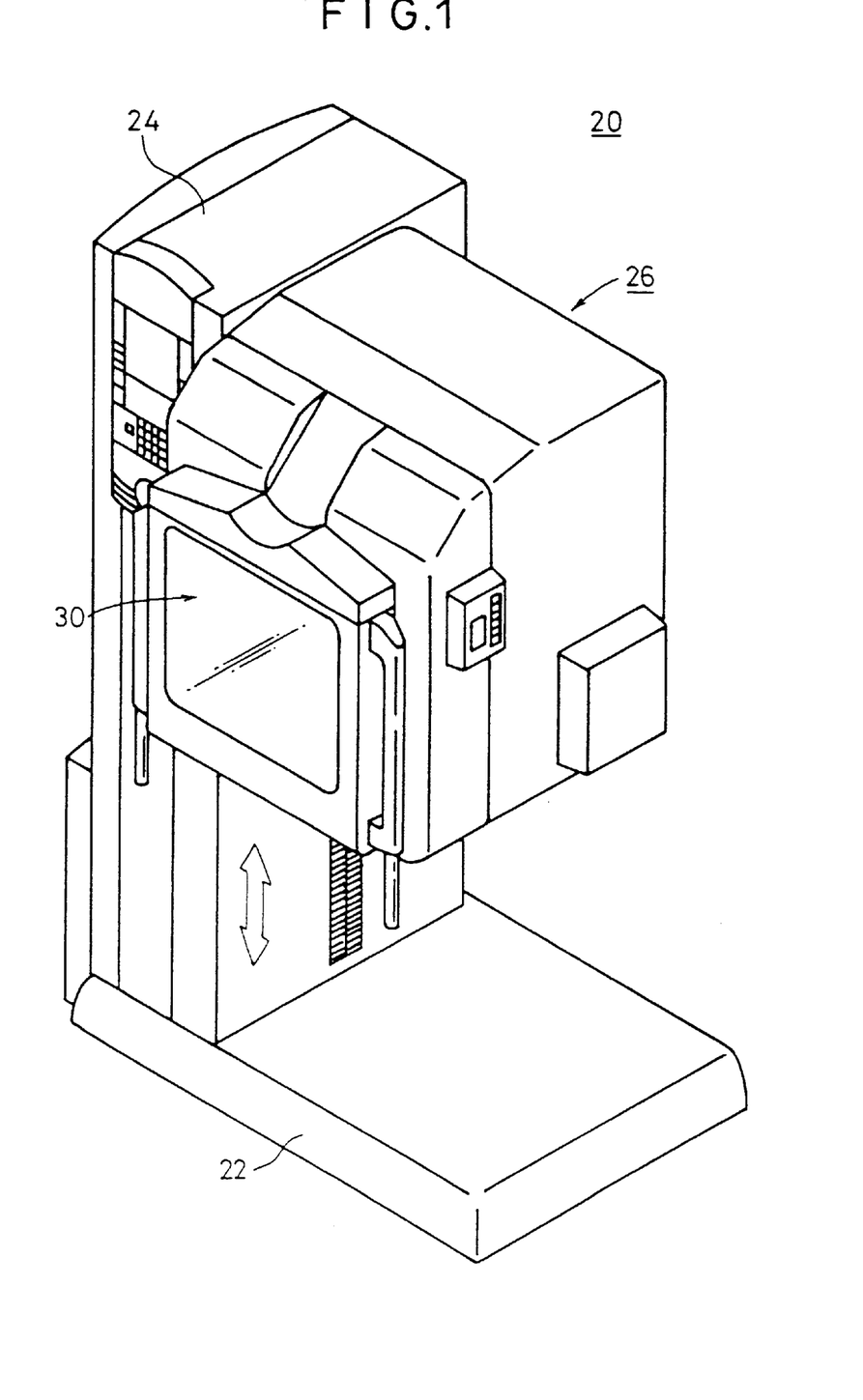
FIG. 1 is a perspective view of a radiation image information reading apparatus which incorporates a scanning apparatus according to the present invention.
Figure 2:
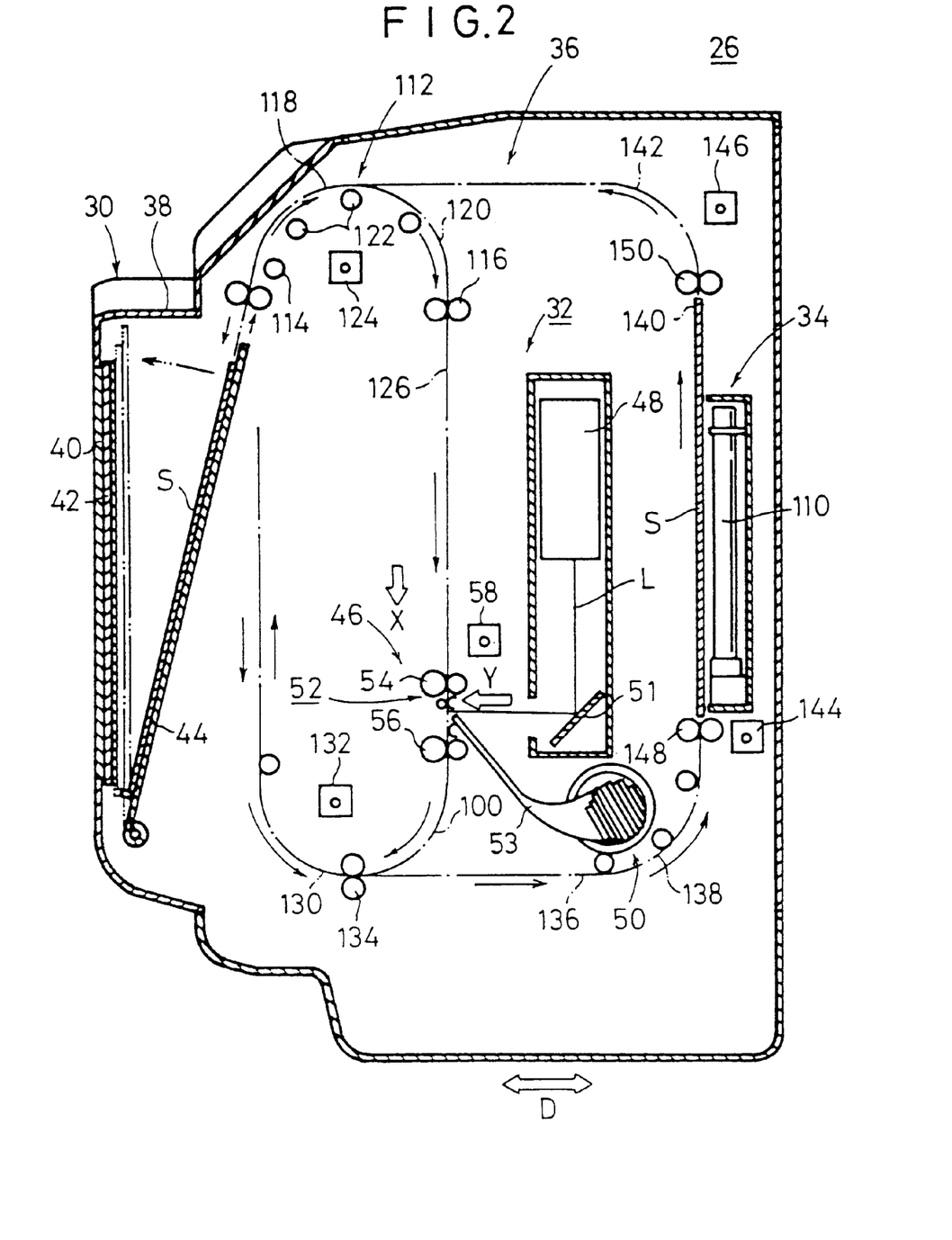
FIG. 2 is a vertical cross-sectional view of an internal structure of the radiation image information reading apparatus shown in FIG. 1.

FIG. 1 shows in perspective a radiation image information reading apparatus 20 which incorporates an apparatus for scanning a sheet-like recording medium according to the present invention. FIG. 2 shows in vertical cross section an internal structure of the radiation image information reading apparatus 20.

As shown in FIG. 1, the radiation image information reading apparatus 20 has a lifting unit 24 mounted upwardly on a base 22. The radiation image information reading apparatus 20 has a main assembly 26 vertically movably supported on the lifting unit 24 by an actuator (not shown) including a ball screw, a cylinder, etc. The radiation image information reading apparatus 20 operates by circulating two stimulable phosphor sheets (sheet-like recording mediums) S in the main assembly 26 for repeatedly recording and reading radiation image information of subjects on and from the stimulable phosphor sheets S.

As shown in FIG. 2, the main assembly 26 includes an exposure unit 30 for temporarily recording radiation image information of a subject on a stimulable phosphor sheet S. an image information reading unit (scanning unit) 32 for applying a laser beam L as stimulating rays to the stimulable phosphor sheet W with the recorded radiation image information to photoelectrically reading the recorded radiation image information, an erasing unit 34 for erasing remaining image information from the stimulable phosphor sheet S after the recorded image information has been read, and a circulatory feed system 36 for circulating the two stimulable phosphor sheets S.

The exposure unit 30 has an exposure cover 38 mounted on a front face of the main assembly 26 and supporting a photo timer 40 and a grid 42 arranged successively from the subject (not shown), and a swingable presser plate 44 disposed near the grid 42 for holding the stimulable phosphor sheet S in an exposure position.

The image information reading unit 32 is disposed substantially parallel to the exposure unit 30. The image information reading unit 32 comprises an auxiliary scanning feed means 46 for feeding the stimulable phosphor sheet S vertically downwardly in an auxiliary scanning direction indicated by the arrow X, a laser beam applying means (scanning rays applying means) 48 for applying a laser beam L as stimulating rays to the stimulable phosphor sheet S which is being fed in the auxiliary scanning direction, substantially horizontally in the direction indicated by the arrow Y and scanning the stimulable phosphor sheet S with the laser beam L in a main scanning direction perpendicular to the auxiliary scanning direction, a reading means 50 for collecting light emitted from the stimulable phosphor sheet S and photoelectrically reading the radiation image information carried by the stimulable phosphor sheet S from the collected light, and a sheet holding means 52 for holding opposite surfaces of the stimulable phosphor sheet S in the vicinity of the beam applying position where the laser beam L is applied to the stimulable phosphor sheet S, to prevent the stimulable phosphor sheet S from being unduly displaced transversely back and forth in the beam applying position.

The laser beam applying means 48 emits the laser beam L downwardly. The image information reading unit 32 includes an optical system 51 for directing the laser beam L substantially horizontally to the stimulable phosphor sheet S. A light guide 53 for collecting light emitted from the stimulable phosphor sheet S when the laser beam L is applied thereto is disposed in the vicinity of the beam applying position. A photomultiplier (not shown) is connected to the light guide 53, making up the reading means 50.

The auxiliary scanning feed means 46 has first and second roller pairs 54, 56 that are spaced a predetermined distance from each other in the vertical direction indicated by the arrow X. The first and second roller pairs 54, 56 are synchronously rotatable by a transmitting means (not shown) comprising a belt and pulleys and operatively coupled to a motor 58. The first and second roller pairs 54, 56 grip opposite marginal edges of the stimulable phosphor sheet S where no radiation image information is recorded and read, to feed the stimulable phosphor sheet S.

Figure 3:
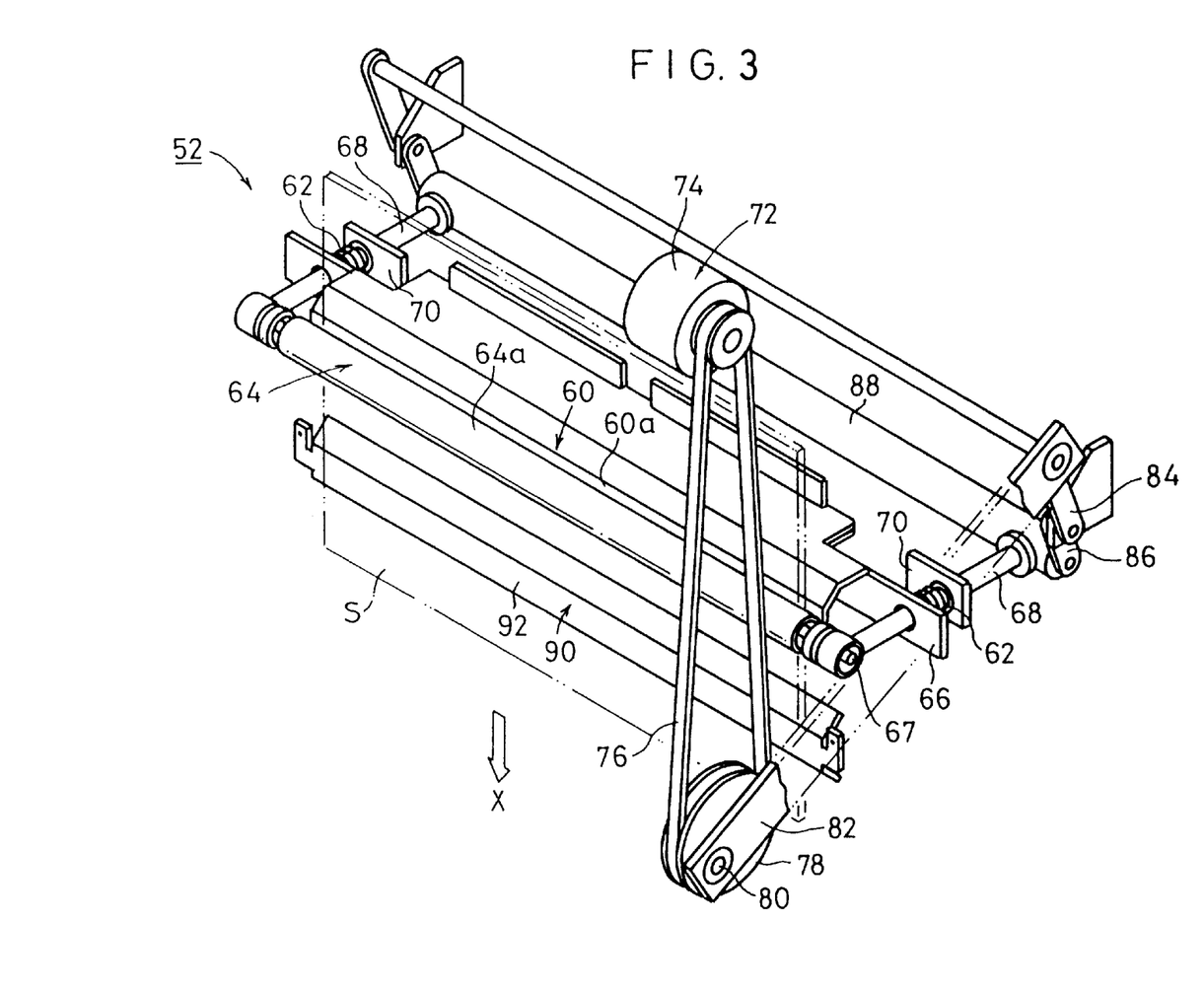
FIG. 3 is a perspective view of the scanning apparatus.
Figure 4:
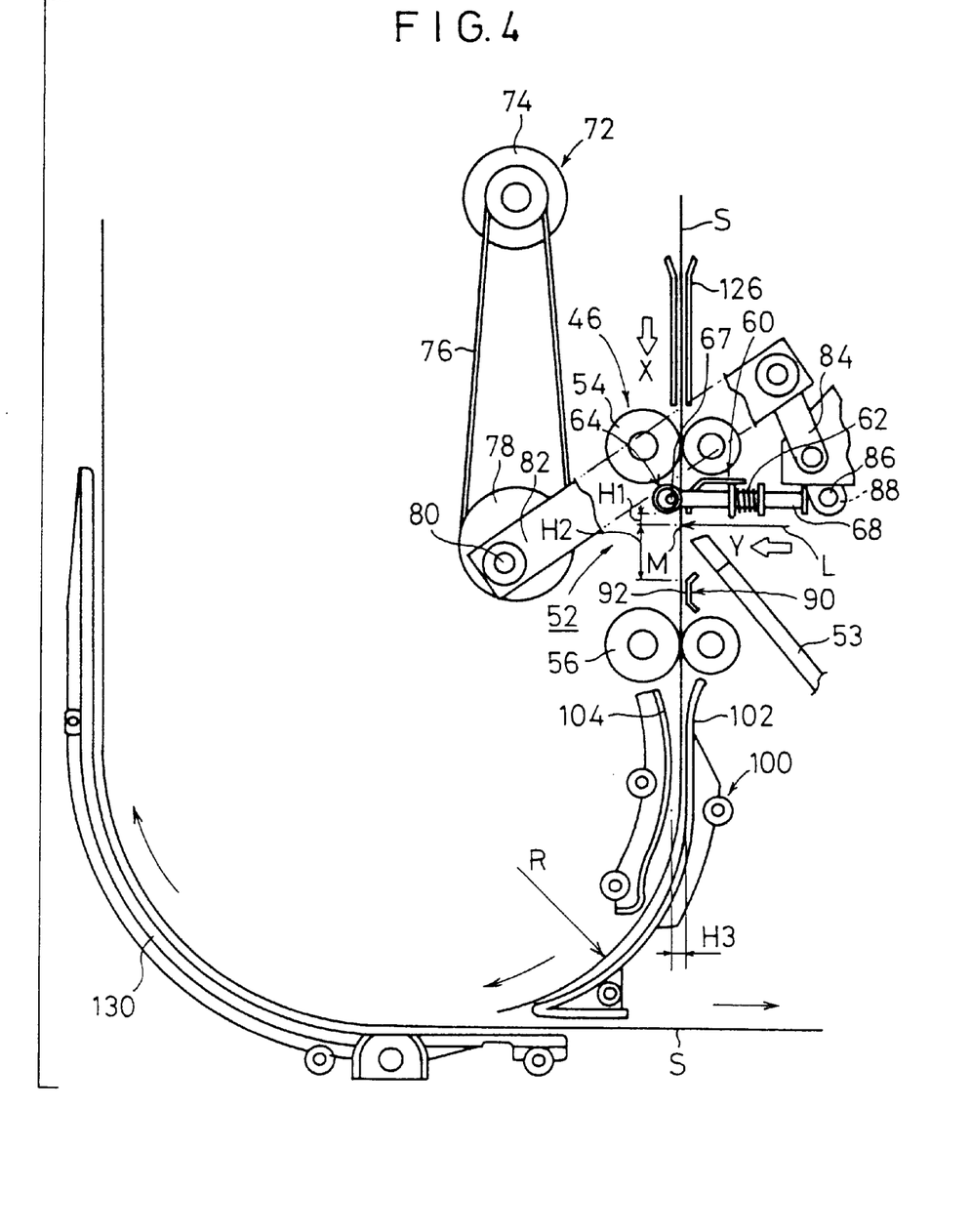
FIG. 4 is a front elevational view of the scanning apparatus.

As shown in FIGS. 3 and 4, the sheet holding means 52 comprises a planar first guide member 60 disposed between the first and second roller pairs 54, 56 and near the first roller pair 54 and held in contact with an exposure surface (one surface) of the stimulable phosphor sheet S fully thereacross, and a substantially cylindrical second guide member 64 held in contact with a reverse surface (other surface) of the stimulable phosphor sheet S fully thereacross and movable toward and away from the first guide member 60, the second guide member 64 being normally biased toward the first guide member 60 by helical springs (resilient members) 62.

The first guide member 60 is secured to a fixed frame 66. A pair of shafts 68 is fixed to respective opposite ends of a small-diameter rod 67 that is disposed and extends through the second guide member 64. The shafts 68 extend through respective opposite ends of the fixed frame 66. The helical springs 62 are interposed between support plates 70 fixed to the respective shafts 68 and the fixed frame 66.

The second guide member 64 is normally biased to move toward the first guide member 60 under the resiliency of the helical springs 62. An actuating mechanism 72 is operatively coupled to the shaft 68 for pushing the second guide member 64 in a direction away from the first guide member 60. The second guide member 64 is urged by the springs 62 to press the stimulable phosphor sheet S against the first guide member 60 under a force that is set to a value greater than the rigidity of the stimulable phosphor sheet S.

The actuating mechanism 72 comprises a motor 74 whose drive shaft is operatively connected to a crank member 78 by a belt and pulley mechanism 76. The crank member 78 has an eccentric pin 80 coupled to an end of an elongate first link 82 whose other end is angularly movably connected to an end of a second link 84. The second link 84 is coupled by a third link 86 to a rod-shaped presser 88 which can be displaced into and out of contact with the shafts 68.

The first and second guide members 60, 64 have respective dampers 60a, 64a on at least their surfaces held against the stimulable phosphor sheet S. The dampers 60a, 64a comprise respective cloths of polyester which are applied to the surfaces of the first and second guide members 60, 64 which are made of SUS (stainless steel).

A guide member 90 for contacting at least one of the opposite surfaces of the stimulable phosphor sheet S, e.g., the exposure surface thereof, is disposed downstream of the beam applying position. The guide member 90 is positioned above and near the second roller pair 56, and is in the form of a plate extending fully across the stimulable phosphor sheet S. A damper 92 is mounted on the surface of the guide member 90 which is held against the stimulable phosphor sheet S.

As shown in FIG. 4, the distance Hi from a scanning line M at the beam applying position to the second guide member 64 of the sheet holding means 52 is set to 6 mm, and the distance H2 from the scanning line M to the guide member 90 is set to 15 mm.

A curved feed path 100 for feeding the stimulable phosphor sheet S is disposed downstream of the second roller pair 56. The curved feed path 100 comprises first and second guide plates 102, 104 that are spaced from each other by a distance H3. The curved feed path 100 has a radius R of curvature which is set to 70 mm. The stimulable phosphor sheet S has a thickness of 0.8 mm. The distance H3 between the first and second guide plates 102, 104 is set to 2 mm or smaller.

As shown in FIG. 2, the erasing unit 34 is disposed substantially parallel to the exposure unit 30 and the image information reading unit 32, and extends vertically. The erasing unit 34 has a plurality of vertically extending erasing light sources 110. The erasing light sources 110 may instead extend horizontally.

The circulatory feed system 36 is disposed between the exposure unit 30 and the image information reading unit 32, and has a turning feed means 112 for turning the stimulable phosphor sheet S through 180° and feeding the stimulable phosphor sheet S from the exposure unit 30 to the image information reading unit 32. The turning feed means 112 is disposed between a roller pair 114 positioned near a sheet outlet of the exposure unit 30 and a roller pair 116 disposed above the image information reading unit 32. The turning feed means 112 comprises a pair of curved guide plates 118, 120 and a plurality of guide rollers 122 disposed beneath the curved guide plates 118, 120. The curved guide plates 118, 120 are of narrow dimensions for guiding the opposite marginal edges of the stimulable phosphor sheet S. The roller pairs 114, 116 are rotatable by a motor 124.

A pair of guide plates 126 for guiding the opposite marginal edges of the stimulable phosphor sheet S extends downwardly from the roller pair 116 toward the image information reading unit 32. A curved guide plate 130 is disposed at a sheet outlet of the image information reading unit 32 for guiding the opposite marginal edges of the stimulable phosphor sheet S upwardly from the curved feed path 100. The curved guide plate 130 has a straight vertical end extending upwardly.

A roller pair 134 rotatable by a motor 132 is disposed near the curved guide plate 130. A horizontal guide plate 136 extends from a position near the roller pair 134 toward the light guide 53. A vertical guide plate 140 extends upwardly from a curved guide plate 138 which is positioned near an end of the guide plate 136. The guide plate 140 extends along the erasing unit 34 and has an upper end positioned near a curve guide plate 142 whose end is positioned near the curved guide plate 118. Roller pairs 148, 150 rotatable respectively by motors 144, 146 are disposed below and above the guide plate 140.

Operation of the radiation image information reading apparatus 20 will be described below.

Two stimulable phosphor sheets S are housed in the main assembly 26. When one of the stimulable phosphor sheets S is placed in the exposure unit 30, the other stimulable phosphor sheet S is positioned in a standby mode in the erasing unit 34 (see FIG. 2). In the exposure unit 30, the presser plate 44 is turned toward a subject (not shown) to hold the stimulable phosphor sheet S in the exposure position. The radiation image information of a subject is recorded on the stimulable phosphor sheet S thus held in the exposure position.

The stimulable phosphor sheet S exposed to the radiation image information is then turned inwardly together with the presser plate 44, and thereafter delivered toward the roller pair 114. The roller pair 114 which is rotated by the motor 124 feeds the stimulable phosphor sheet S to the turning feed means 112. In the turning feed means 112, the curved guide plates 118, 120 and the guide rollers 122 guide the stimulable phosphor sheet S to the roller pair 116 while turning through 180°, after which the stimulable phosphor sheet S is transferred by the rotating roller pair 116 to the vertical guide plate 126. The stimulable phosphor sheet S is then delivered to the auxiliary scanning feed means 46 while its opposite marginal edges are being guided by the guide plate 126.

In the auxiliary scanning feed means 46, the first and second roller pairs 54, 56 which are vertically spaced from each other are rotated by the motor 58. The stimulable phosphor sheet S is first fed in the auxiliary scanning direction (downward direction) indicated by the arrow X while its opposite marginal edges are being gripped by the first roller pair 54.

Figure 5:
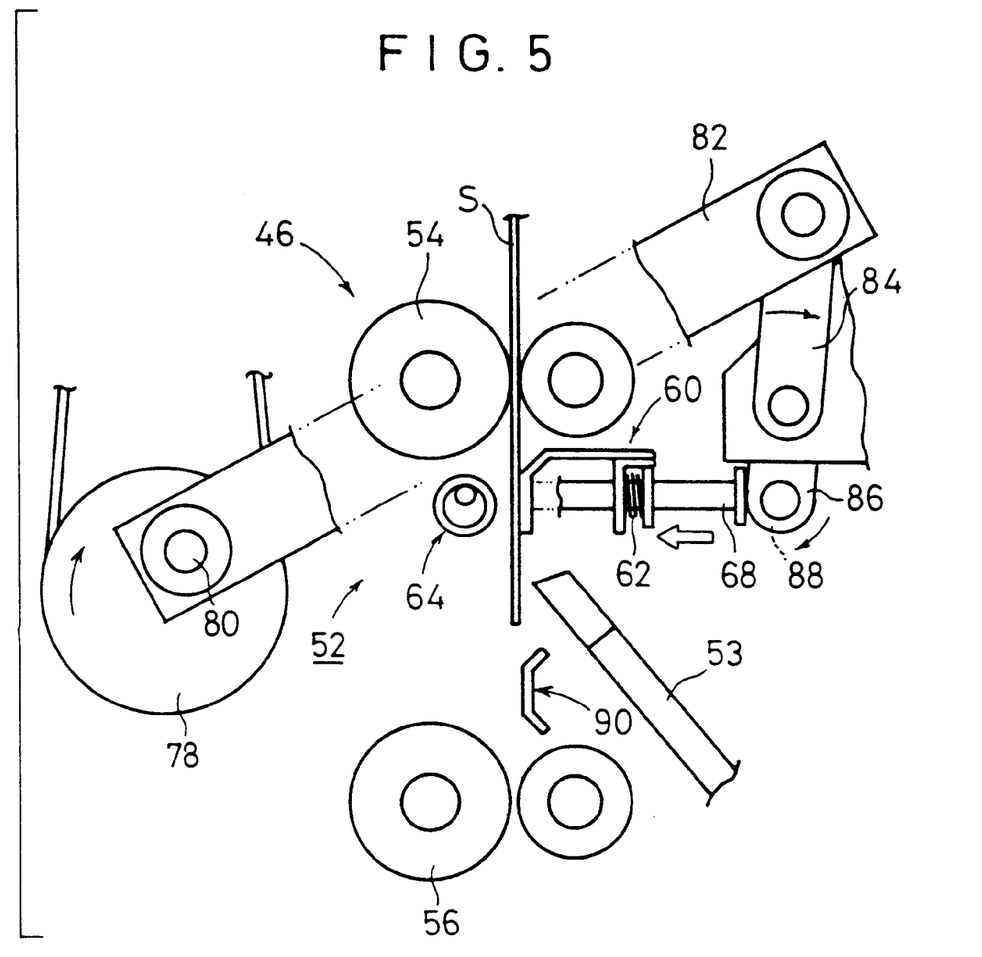
FIG. 5 is an enlarged fragmentary front elevational view of a sheet holding means, as it is separated, of the scanning apparatus.

In the sheet holding means 52, the actuating mechanism 72 is operated to enable the presser 88 to press the shafts 68 against the bias of the springs 62 for thereby holding the second guide member 64 spaced from the first guide member 60 (see FIG. 5). When the leading end of the stimulable phosphor sheet S which is being gripped by the first roller pair 54 and fed in the auxiliary scanning direction indicated by the arrow X enters between the first and second guide members 60, 64, the motor 74 of the actuating mechanism 72 is energized.

Figure 6:
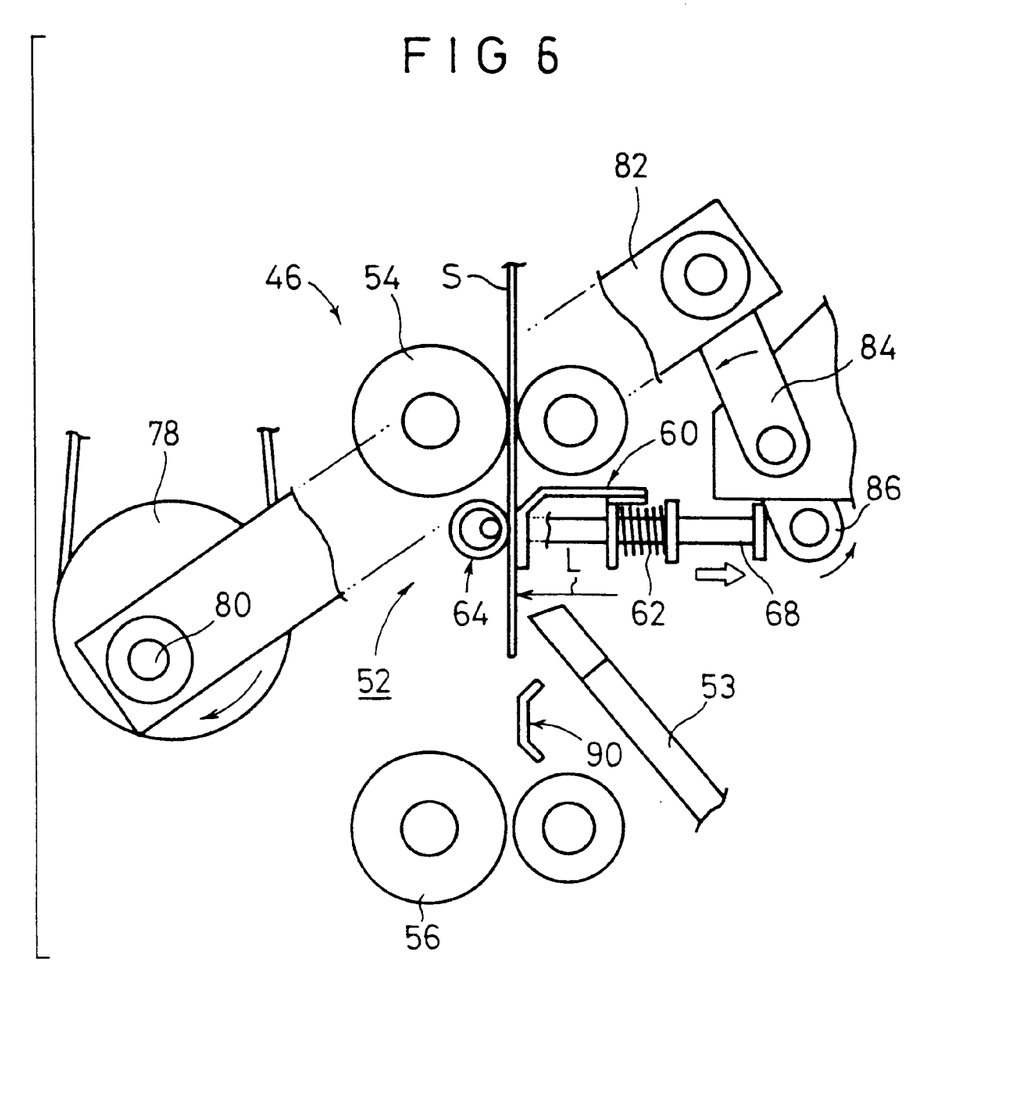
FIG. 6 is an enlarged fragmentary front elevational view of the sheet holding means as it holds a stimulable phosphor sheet.

As shown in FIGS. 3 and 4, the belt and pulley mechanism 76 rotates the crank member 78 to turn the eccentric pin 80 which causes the first and second links 82, 84 to swing the presser 88 in a direction away from the shafts 68. The second guide member 64 is now displaced toward the first guide member 60 under the bias of the springs 62, whereupon the first and second guide members 62, 64 hold the opposite surfaces of the stimulable phosphor sheet S fully thereacross (see FIG. 6).

With the stimulable phosphor sheet S being held by the first and second guide members 62, 64, the opposite marginal edges thereof at its leading end are gripped by the second roller pair 56. The stimulable phosphor sheet S is then fed in the auxiliary scanning direction indicated by the arrow X by the first and second roller pairs 54, 56. At this time, the laser beam applying means 48 emits a laser beam L which travels downwardly and is then directed substantially horizontally by the optical system 51. The laser beam L is applied to scan the exposure surface of the stimulable phosphor sheet S in the main scanning direction. When the laser beam L is applied to the stimulable phosphor sheet S, the exposure surface of the stimulable phosphor sheet S emits light, which is collected by the light guide 53 and then photoelectrically read by the non-illustrated photomultiplier.

The first and second roller pairs 54, 56 feed the stimulable phosphor sheet S in the auxiliary scanning direction by gripping only the opposite marginal edges thereof. Therefore, while being fed in the auxiliary scanning direction, the stimulable phosphor sheet S tends to be unduly displaced transversely back and forth, and such undesirable transverse displacements may possibly cause a failure to read the recorded radiation image information from the stimulable phosphor sheet S.

In the illustrated embodiment, the sheet holding means 52 is positioned near the scanning line M, and has the first and second guide members 60, 64 hold the opposite surfaces of the stimulable phosphor sheet S fully thereacross. The first and second guide members 60, 64 are effective in reliably preventing the stimulable phosphor sheet S from being unduly displaced transversely back and forth while the stimulable phosphor sheet S is being fed in the auxiliary scanning direction, and keep the stimulable phosphor sheet S stably in a vertical orientation at all times while it is being fed in the auxiliary scanning direction. As a result, the radiation image information carried by the stimulable phosphor sheet S can be read highly accurately.

The dampers 60a, 64a are applied to the surfaces of the first and second guide members 60, 64 for preventing the stimulable phosphor sheet S from being damaged or smeared. Therefore, the stimulable phosphor sheet S remains durable and clean over a long period of time.

The guide member 90 is disposed downstream of the scanning line M on a side of the beam applying position away from the direction in which the curved feed path 100 is curved, i.e., in a position facing the exposure surface of the stimulable phosphor sheet S. Accordingly, while the exposure surface of the stimulable phosphor sheet S is being held by the guide member 90 that extends fully across the stimulable phosphor sheet S, the recorded radiation image information is read from the stimulable phosphor sheet S as it is curved along the curved feed path 100. The stimulable phosphor sheet S is thus effectively prevented from being unduly displaced transversely, allowing the recorded radiation image information to be read in high quality. The damper 92 on the guide member 90 prevents the exposure surface of the stimulable phosphor sheet S from being damaged or smeared.

The first and second guide plates 102, 104 of the curved feed path 100 are spaced from each other by the distance of 2 mm or less. The closely spaced first and second guide plates 102, 104 are also effective to prevent the stimulable phosphor sheet S from being unduly displaced transversely while it is being fed along the curved feed path 100.

The leading end of the stimulable phosphor sheet S is then guided by the curved guide plate 130 and fed upwardly by the roller pair 134. After the radiation image information is fully read from the stimulable phosphor sheet S, the trailing end of the stimulable phosphor sheet S is delivered to a position near the roller pair 134. The roller pair 134 is then reversed by the motor 132.

The stimulable phosphor sheet S is fed horizontally along the guide plate 136 with its exposure surface facing downwardly, after which the stimulable phosphor sheet S is fed upwardly along the curved guide plate 138. The motor 144 rotates the roller pair 148 to feed the stimulable phosphor sheet S upwardly along the guide plate 140. The erasing light sources 110 of the erasing unit 34 are energized to erase any remaining image information from the stimulable phosphor sheet S. The stimulable phosphor sheet S from which the remaining image information has been erased remains positioned in the standby mode in the erasing unit 34.

When the radiation image information is being recorded on the stimulable phosphor sheet S in the exposure unit 30, the other stimulable phosphor sheet S is positioned in the standby mode in the erasing unit 34. While the radiation image information from the exposure unit 30 is being read from the stimulable phosphor sheet S, the other stimulable phosphor sheet S is gripped and delivered from the erasing unit 34 by the roller pair 150 rotated by the motor 146 to the curved guide plate 118 along the curved guide plate 142. The roller pair 114 is reversed to deliver the other stimulable phosphor sheet S into the exposure unit 30. The other stimulable phosphor sheet S is positioned in the exposure unit 30 by the presser plate 44 angularly moved to the exposure position. The radiation image information of a subject (not shown) is then recorded on the stimulable phosphor sheet S in the exposure unit 30.

The image information reading unit 32 for photoelectrically reading the radiation image information recorded on the stimulable phosphor sheet S is arranged such that it applies the laser beam L substantially horizontally to the stimulable phosphor sheet S while the stimulable phosphor sheet S is being fed downwardly in the auxiliary scanning direction indicated by the arrow X. Accordingly, the horizontal dimensions of the image information reading unit 32 are much smaller than a conventional image information reading unit in which the stimulable phosphor sheet S is scanned by the laser beam in the main scanning direction while the stimulable phosphor sheet S is being fed horizontally in the auxiliary scanning direction. As a consequence, the main assembly 26 has a greatly reduced depth in the direction indicated by the arrow D.

In the illustrated embodiment, the sheet holding means 52 has the planar first guide member 60 and the substantially cylindrical second guide member 64. However, the sheet holding means 52 is not limited to these guide members, but may have planar first and second guide members or substantially cylindrical first and second guide members. If the first guide member 60 disposed so as to face the exposure surface of the stimulable phosphor sheet S comprises a rotatable cylindrical member, then the stimulable phosphor sheet S is reliably prevented from being damaged by the first guide member 60. Though the guide member 90 is in the form of a plate in the illustrated embodiment, the guide member 90 may be of a construction identical to the sheet holding means 52 for more effectively preventing the stimulable phosphor sheet S from being unduly displaced transversely back and forth.

The sheet-like recording medium may comprise a photographic film with an image recorded thereon, rather than the stimulable phosphor sheet S. If the sheet-like recording medium comprises a photographic film, then the image information reading unit 32 may have a scanning device for scanning such a photographic film.

In the apparatus for scanning the sheet-like recording medium according to the present invention, scanning light is applied substantially horizontally to the sheet-like recording medium while the sheet-like recording medium is being fed vertically in the auxiliary scanning direction. Therefore, the dimensions of the scanning apparatus in the depth thereof are much smaller than the conventional horizontal scanning apparatus in which the sheet-like recording medium is fed horizontally in the auxiliary scanning direction. The sheet holding means for holding the opposite surfaces of the sheet-like recording medium to prevent the sheet-like recording medium from being unduly displaced transversely back and forth is disposed near the beam applying position. Thus, the sheet-like recording medium that is being fed vertically is reliably prevented from being unduly displaced transversely back and forth, so that the image information read from the sheet-like recording medium is free of irregularities which would otherwise be caused by such transverse displacements of the sheet-like recording medium, and hence the image information can be read highly accurately from the sheet-like recording medium.

Although a certain preferred embodiment of the present invention has been shown and described in detail, it should be understood that various changes and modifications may be made therein without departing from the scope of the appended claims.

What is claimed is:

1. An apparatus for scanning a sheet-like recording medium, comprising:

auxiliary scanning feed means for feeding a sheet-like recording medium vertically in an auxiliary scanning direction;

scanning light applying means for applying scanning light substantially horizontally to the sheet-like recording medium in a beam applying position and scanning the sheet-like recording medium with the scanning light in a main scanning direction;

sheet holding means for holding opposite surfaces of the sheet-like recording medium near said beam applying position to prevent the sheet-like recording medium from being positionally displaced in said beam applying position, wherein said sheet holding means comprises:

a first guide member for contacting one surface of said sheet-like recording medium fully thereacross;

a second guide member for contacting another surface of said sheet-like recording medium fully thereacross, said second guide member being movable toward and away from said first guide member; and a resilient member biasing said second guide member towards said first guide member; and said apparatus further comprises:

actuating means for pushing said second guide member in a direction away from said first guide member against the bias of said resilient member.

2. An apparatus according to claim 1, wherein said resilient member is connected between said first guide member and said second guide member.

3. An apparatus according to claim 2, wherein said first and second guide members have respective dampers disposed on at least respective surfaces thereof held against said sheet-like recording medium.

4. An apparatus according to claim 2, wherein said first and second guide members comprise planar or cylindrical guide members.

5. An apparatus according to claim 1, wherein said auxiliary scanning feed means comprises:

first and second roller pairs spaced a predetermined distance vertically from each other, for gripping opposite marginal edges of said sheet-like recording medium outside of a recorded area thereof to feed said sheet-like recording medium.

6. An apparatus according to claim 1, further comprising:

guide means for contacting at least one surface of said sheet-like recording medium downstream of said beam applying position, said guide means having a damper disposed on a surface thereof.

7. An apparatus according to claim 6, wherein said guide means is held against a surface of said sheet-like recording medium away from the direction in which said sheet-like recording medium is curved downstream of said guide means.

8. An apparatus according to claim 1, further comprising:

a curved feed path for feeding said sheet-like recording medium therealong downstream of said beam applying position, said curved feed path comprising first and second curved guide plates spaced from each other by a distance of at most 2 mm.

9. An apparatus according to claim 1, wherein said sheet-like recording medium comprises a stimulable phosphor sheet, further comprising:

reading means for collecting light emitted from said stimulable phosphor sheet and photoelectrically reading radiation image information carried by said stimulable phosphor sheet from the collected light.

10. An apparatus according to claim 1, wherein said resilient member is configured and arranged so as to press the second guide member against the first guide member with a force greater than a rigidity of the sheet-like recording medium.

11. An apparatus for scanning a sheet-like recording medium, comprising:

auxiliary scanning feed means for feeding a sheet-like recording medium vertically in an auxiliary scanning direction, wherein said auxiliary scanning feed means comprises first and second roller pairs spaced a predetermined distance vertically from each other, for gripping opposite marginal edges of said sheet-like recording medium outside of a recorded area thereof to feed said sheet-like recording medium;

scanning light applying means for applying scanning light substantially horizontally to the sheet-like recording medium in a beam applying position and scanning the sheet-like recording medium with the scanning light in a main scanning direction; and sheet holding means for holding opposite surfaces of the sheet-like recording medium near said beam applying position to prevent the sheet-like recording medium from being positionally displaced in said beam applying position, wherein said sheet holding means comprises:

a first guide member for contacting one surface of said sheet-like recording medium fully thereacross;

a second guide member for contacting another surface of said sheet-like recording medium fully thereacross, said second guide member being movable toward and away from said first guide member; and a resilient member biasing said second guide member towards said first guide member, wherein said resilient member is configured and arranged so as to press the second guide member against the first guide member with a force greater than a rigidity of the sheet-like recording medium.

12. An apparatus for scanning a sheet-like recording medium, comprising:

auxiliary scanning feed means for feeding a sheet-like recording medium vertically in an auxiliary scanning direction;

scanning light applying means for applying scanning light substantially horizontally to the sheet-like recording medium in a beam applying position and scanning the sheet-like recording medium with the scanning light in a main scanning direction;

sheet holding means for holding opposite surfaces of the sheet-like recording medium near said beam applying position to prevent the sheet-like recording medium from being positionally displaced in said beam applying position; and guide means for contacting at least one surface of said sheet-like recording medium downstream of said beam applying position, wherein said guide means is disposed closer to said beam applying position than is said auxiliary scanning feed means.

13. An apparatus for scanning a sheet-like recording medium, comprising:

a first roller pair and a second roller pair disposed so as to feed a sheet-like recording medium vertically in an auxiliary scanning direction;

a light source that applies scanning light substantially horizontally to the sheet-like recording medium in a beam applying position so as to scan the sheet-like recording medium with the scanning light in a main scanning direction;

a sheet holding member disposed so as to hold opposite surfaces of the sheet-like recording medium near said beam applying position to prevent the sheet-like recording medium from being positionally displaced in said beam applying position, wherein said sheet holding member comprises:

a first guide member for contacting one surface of said sheet-like recording medium fully thereacross;

a second guide member for contacting another surface of said sheet-like recording medium fully thereacross, said second guide member being movable toward and away from said first guide member; and a resilient member biasing said second guide member towards said first guide member; and said apparatus further comprises:

a presser member that pushes said second guide member in a direction away from said first guide member against the bias of said resilient member.

* * * * *